Figure 1:
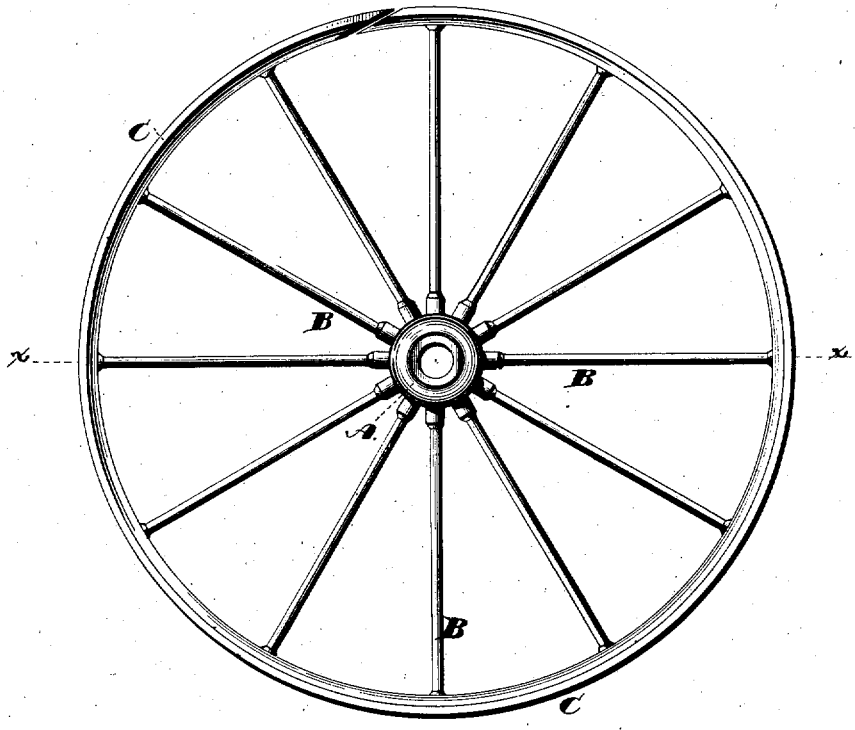

2 Sheets—Sheet 1.

J. R. LITTLE.

Assignor, by direct and mesne assignments, to the QUINCY METAL WHEEL COMPANY.

WHEEL.

No. 10,842. Reissued June 7, 1887.

Witnesses:
Chas J. Williamson
Jas. E. Hutchinson.

Inventor
Jas. R. Little, by
Arnoldus Russell, his Attys

2 Sheets—Sheet 2.

J. R. LITTLE.

Assignor, by direct and mesne assignments, to the QUINCY METAL WHEEL COMPANY.

WHEEL.

No. 10,842. Reissued June 7, 1887.

Witnesses:
Chas. J. Williamson.
Jas. E. Hutchinson.

Inventor:
Jas. R. Little, by
Prindle & Russell, his Attys.

UNITED STATES PATENT OFFICE.

JAMES R. LITTLE, OF QUINCY, ILLINOIS, ASSIGNOR, BY DIRECT AND MESNE ASSIGNMENTS, TO THE QUINCY METAL WHEEL COMPANY, OF SAME PLACE.

WHEEL.

SPECIFICATION forming part of Reissued Letters Patent No. 10,842, dated June 7, 1887.

Original No. 273,746, dated March 13, 1883. Application for reissue filed February 15, 1886. Serial No. 192,017.

DIVISION A.

*To all whom it may concern:*

Be it known that I, JAMES R. LITTLE, of Quincy, in the county of Adams, and in the State of Illinois, did invent certain new and useful Improvements in Wheels, for which Letters Patent No. 273,746 were issued to me upon the 13th day of March, 1883, which Letters Patent have been found to be inoperative and invalid, in that they do not cover the invention set forth in the specification and shown in the drawings which were filed by me in the Patent Office upon the 31st day of October, 1882, preparatory to the obtaining of the said Letters Patent. Now, therefore, being desirous of reissuing the said Letters Patent, I have prepared, and do hereby declare the following to be, a full, clear, and exact description of the said improvements, reference being had to the accompanying drawings, in which—

Figure 2:
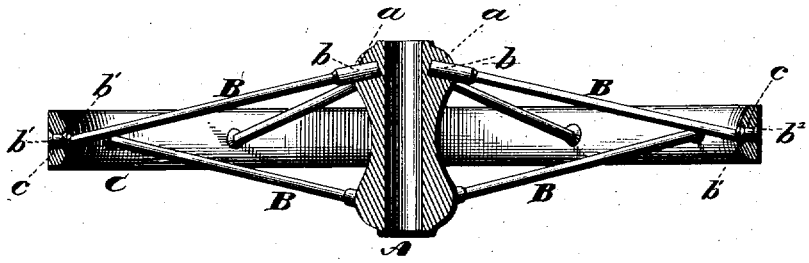
Figure 3:
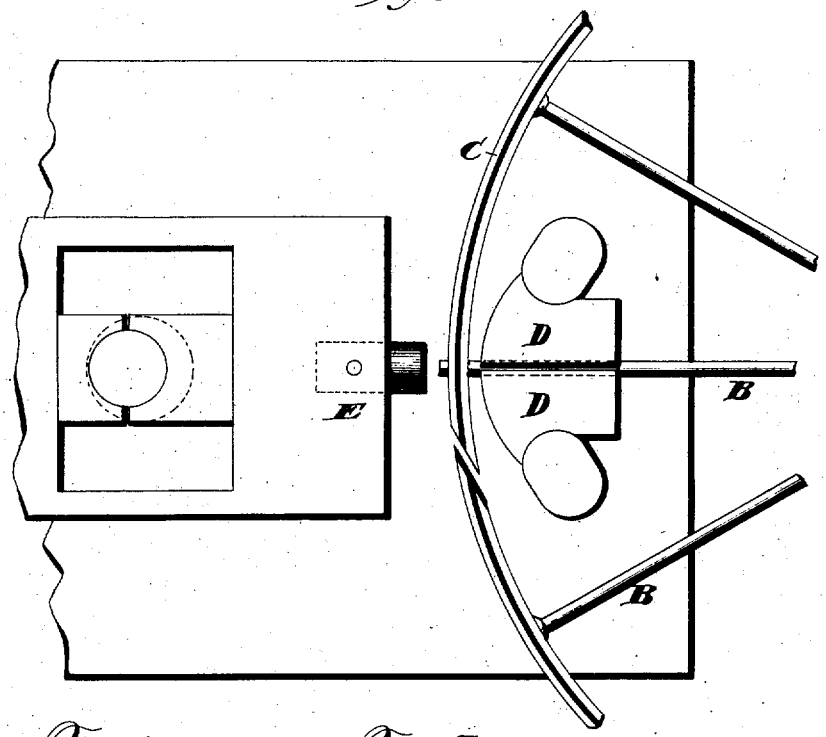
Figure 4:
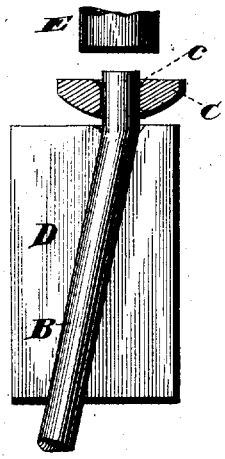
Figure 5:
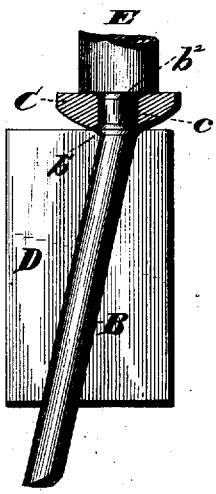
Figure 6:
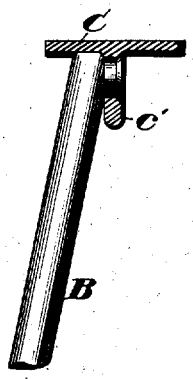

Figure 1 is a side elevation of a wheel embodying my invention, completed with exception of welding together the ends of the rim. Fig. 2 is a section of the same upon line *x x* of Fig. 1. Fig. 3 is a plan view of the mechanism employed for securing the rim to the spokes, a portion of the wheel being shown in position therein. Fig. 4 is a side elevation of one of the spokes and a cross-section of the rim at the point of their intersection, said parts being in position within the mechanism used for uniting them. Fig. 5 is a like view of the same after having been operated upon by said mechanism, and Fig. 6 is a similar view of a rim and spoke in which is shown a modification in the manner of combining the same.

Letters of like name and kind refer to similar parts in each of the figures.

The object of my invention is to produce a strong and durable wheel at a minimum of cost; and to this end said invention consists, principally, in a metal wheel, in which a rim provided with radial mortises is combined with spokes that have less diameter than said mortises, and have their ends enlarged and caused to closely fill the same, substantially as and for the purpose hereinafter specified.

It consists, further, in a metal wheel in which are combined a rim provided with radial mortises that are enlarged at their ends and spokes which have less diameter than said mortises, and have their ends enlarged and caused to closely fill the same, substantially as and for the purpose hereinafter shown.

It consists, further, in a metal wheel which is composed of a rim that is provided with radial mortises which are enlarged at their ends, spokes that have less diameter than said mortises, and have their outer ends enlarged until they closely fill and form enlargements at each end of the same, and a mortised hub which receives and to which are fitted the inner ends of said spokes, substantially as and for the purpose hereinafter set forth.

It consists, further, in a metal wheel in which the spokes have their inner ends enlarged and secured within the hub, and their outer ends secured within a rim and enlarged adjacent to the same, substantially as and for the purpose hereinafter shown and described.

It consists, finally, in a metal wheel in which are combined with a mortised rim spokes that have their inner ends secured within a hub and their outer ends contained within the said rim-mortises, and secured therein by enlargement upon both sides of said rim, substantially as and for the purpose hereinafter specified.

In the carrying of my invention into practice I employ a metal hub, A, that is provided with radial mortises *a*, into each of which is inserted one end *b* of a spoke, B, and the same made tight by driving or by expanding said hub by heat, inserting the spoke, and then cooling the hub, so as to contract its mortises. Said spoke may be constructed from a rod, and have a uniform diameter throughout its length, but preferably has the portion *b* within and immediately outside of said hub enlarged, as shown. Any desired arrangement may be had of the spokes within the hub; but they are preferably arranged in two rows, bracing inward, and staggered in the usual manner.

Upon the outer ends of the spokes B is a rim, C, which preferably has the form in cross-section shown in Fig. 2, and is provided with radial mortises *c*, that are enlarged at their inner and outer ends, and have each a greater diameter than the diameter of its spoke, The rim C being in place upon the spokes, each spoke B is secured in its mortise *c* by being grasped firmly between two clamps, D and D, at a point near the inner periphery of said rim, after which a hammer, E, is caused to impinge upon the outer end of said spoke, and by longitudinal compression of the same to enlarge the portion within and at each end of said mortise *c*, as shown in Figs. 2 and 5. The portion of the spoke B within the mortise *c* has a larger diameter than the body of said spoke, and is caused to closely fill said mortise by the longitudinal compression described, while by the enlargements $b'$ and $b^2$ at each end of said mortise the union between said spoke and the rim is strengthened and said parts enabled to successfully resist great radial inward or outward force. In consequence of the enlargement of said spoke inside of said rim, and just outside of the hub A, a material increase of strength is secured at points where spokes are usually weak. After the spokes B have all been secured to the rim C, the ends of the latter are then welded together to complete the wheel. If desired, a tire may be placed upon said rim; but the wheel is complete without a tire.

In Fig. 6 is shown a modification in which the rim C is provided upon its inner periphery with a radially-inward projecting flange, *c'*, within which are formed mortises for the reception of the laterally-bent ends of the spokes B, which spoke ends are then secured in place within their mortises in the manner before described.

Having thus fully set forth the nature and merits of my invention, what I claim as new is—

1. A metal wheel in which a rim provided with radial mortises is combined with spokes that have less diameter than said mortises, and have their ends enlarged and caused to closely fill the same, substantially as and for the purpose specified.

2. A metal wheel in which are combined a rim provided with radial mortises that are enlarged at their ends and spokes which have less diameter than said mortises, and have their ends enlarged and caused to closely fill the same, substantially as and for the purpose shown.

3. A metal wheel which is composed of a rim that is provided with radial mortises that are enlarged at their ends, spokes that have less diameter than said mortises, and have their outer ends enlarged until they closely fill and form enlargements at each end of the same, and a mortised hub which receives and to which are fitted the inner ends of said spokes, substantially as and for the purpose set forth.

4. A metal wheel in which the spokes have their inner ends enlarged and secured within the hub and their outer ends secured within a rim and enlarged adjacent to the same, substantially as and for the purpose shown and described.

In testimony whereof I hereunto set my hand this 15th day of October, 1885.

JAMES R. LITTLE.

Witnesses:

CARL E. EPLER,

T. J. SEEHORN.